Figure 1:
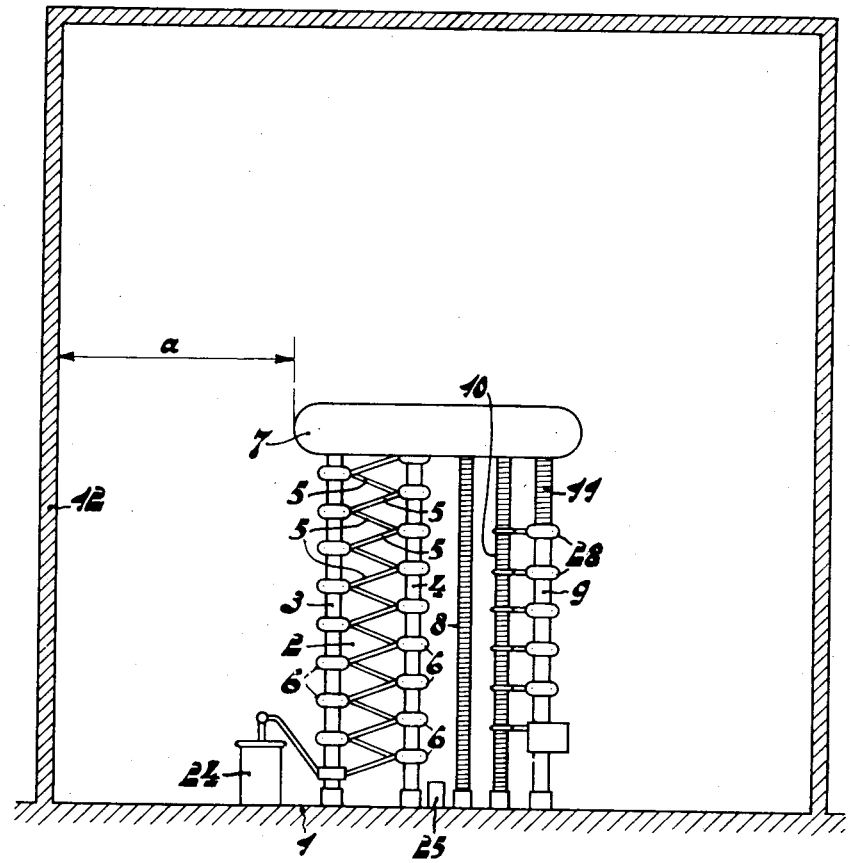

June 3, 1941.  A. BOUWERS  2,243,941
HIGH-TENSION ELECTRICAL SYSTEM
Filed Nov. 2, 1938  2 Sheets-Sheet 1

INVENTOR
ALBERT BOUWERS
BY
ATTORNEY.

June 3, 1941.                A. BOUWERS                2,243,941
                    HIGH-TENSION ELECTRICAL SYSTEM
                          Filed Nov. 2, 1938            2 Sheets-Sheet 2
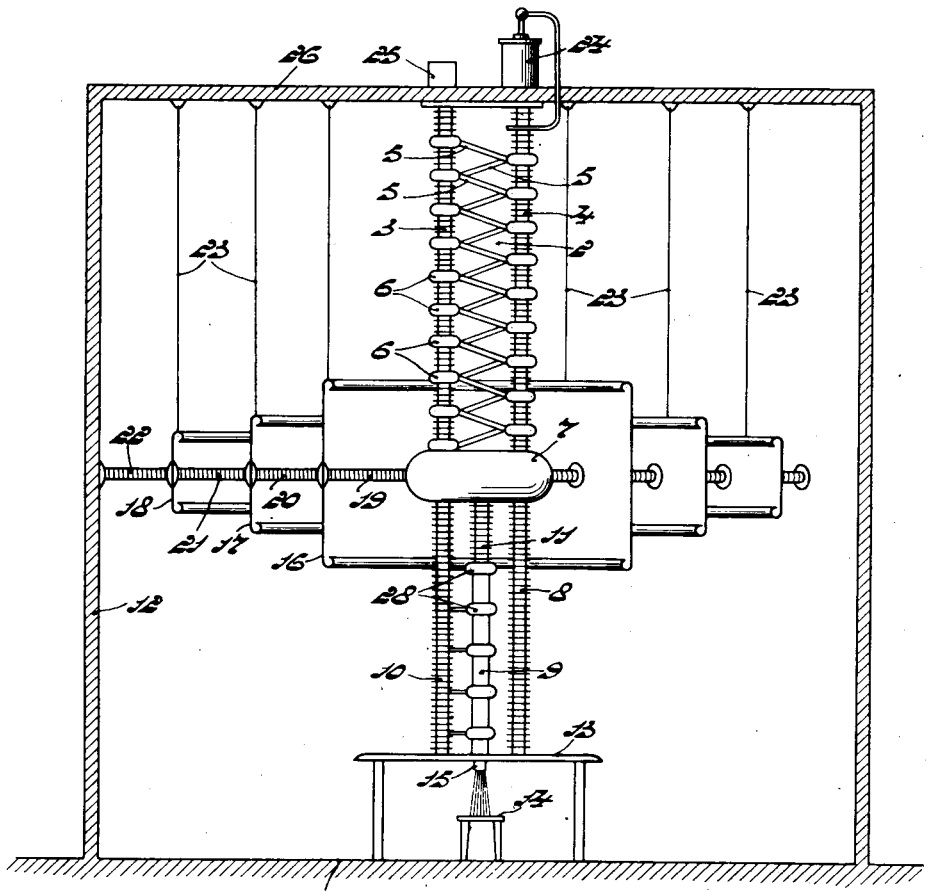
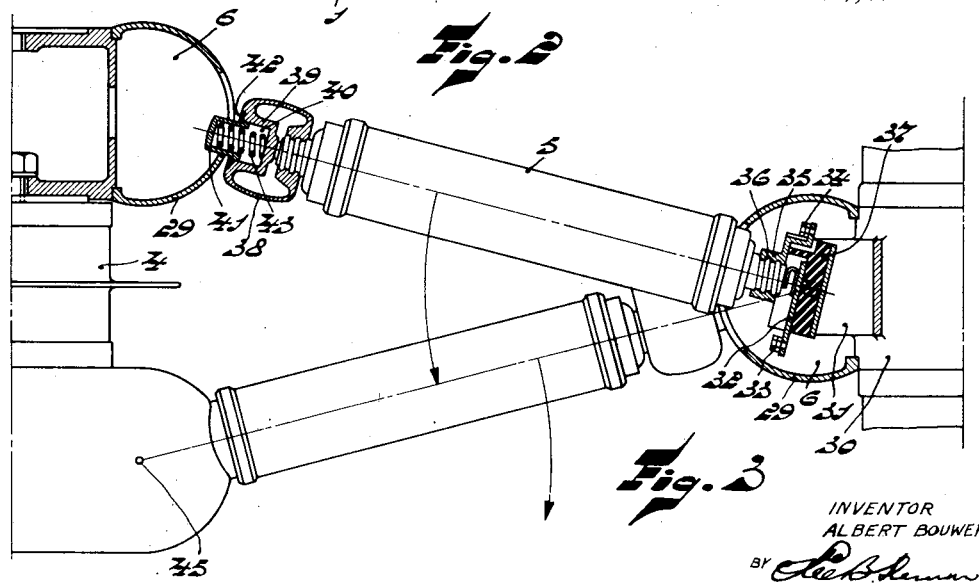
INVENTOR
ALBERT BOUWERS
ATTORNEY.

Patented June 3, 1941

2,243,941

UNITED STATES PATENT OFFICE 2,243,941

HIGH-TENSION ELECTRICAL SYSTEM

Albert Bouwers, Eindhoven, Netherlands, assignor, by mesne assignments, to Hartford National Bank and Trust Company, Hartford, Conn., as trustee Application November 2, 1938, Serial No. 238,448
In Germany November 5, 1937

4 Claims. (Cl. 175—363)

My invention relates to high-tension electrical systems, and more particularly to systems for producing direct voltages of extremely high value, for instance of the order of $10^6$ volts.

For this purpose it has been proposed to use an apparatus known as a voltage multiplier, which comprises condensers and rectifier tubes. More particularly, and as described in my U. S. Patent 1,974,328, in such an apparatus the condensers are arranged in two columns and the rectifiers are connected in series between these columns with each pair of successive rectifiers shunted by a condenser. The first rectifier is shunted by a condenser and a source of alternating current connected in series therewith.

These columns are covered by a metal or metal-coated body having a smooth and rounded surface which acts as a high-tension terminal. Since this terminal body is at a very high potential, it is necessary that it be located at a distance greater than the desired spark distance from the walls of the high-tension room in which the apparatus is located, which walls are at ground potential. If the available space is limited, as is frequently the case, it is preferable that the apparatus be arranged in such manner that this terminal body is situated approximately in the middle of the room.

In order to permit the high-tension produced to be used conductors must be provided, connecting the terminal body with the consuming apparatus, and obviously, the course of the equipotential surfaces of the electric field is influenced by these conductors. If the loads are located in the same room with the voltage multiplier, difficulties arising from insulated connections through the wall are of course obviated, but nevertheless the distances between the walls and those parts of these loads which are under the high tension have nevertheless to be in accordance with the potential differences against which the said parts should be secured.

The object of the present invention is to utilize in the most efficient manner the space available for a high-tension system of the voltage multiplier type, and thus to increase as much as possible the voltage obtainable.

The invention is based on the idea that that portion of the space within the high-tension room which is located above the columnar system and which is substantially as high as the lower part, may be used for the arrangement of parts of the system whose potential has substantially the same variation as the potential gradient which exists in situ. Thus, in the high-tension system according to the invention, the potential as measured from the terminal member varies gradually to the wall or ground potential in one direction along the generator columns and in the opposite direction along the loads.

To avoid the necessity of extending the system above in the high-tension room or on a floor above the latter for manipulation of the apparatus supplied with the direct current of high tension, the system may be built up in the reverse order, i. e. with the generator column arranged above and the loads arranged below.

The system according to the invention insures a substantial saving in space, which in turn permits an increase in the voltage. It is possible to increase the voltage to a still higher value if the space around the high-tension terminal member is subdivided by one or more partitions of insulating material, such as fibrous substances impregnated with synthetic resin substances and compressed. The material known under the registered trade-mark "Pertinax" avoids to a certain extent direct flashing-over, but even cylinders which are conductive will increase the potential security, particularly if they are maintained at a given voltage for the purpose of potential control.

Conductive connections between the terminal member and the side walls of the high-tension room may serve for the control of the electric field. The curvature of the equipotential fields increases from the walls of the room towards the columnar system, and it is possible to avoid the consequential increase in the potential gradient by suitable potential control. In this case the increase in potential per unit length is reduced in the vicinity of the columnar system, and as the resistance to puncture depends essentially on the highest potential gradient it is increased by this step.

In order that a capacitatively favorable potential distribution about the conductive cylinders may be obtained by a potential pulse, for example in the case of puncture of a discharge tube, the internal conductive cylinder should be longer than the external ones.

The system according to the invention may be constructed to produce a high tension which is either negative or positive with respect to ground, and by so constructing the terminals of the rectifiers that they may be reversed it is also possible to arrange it in such manner that it can produce both.

In order that the invention may be clearly understood and readily carried into effect I shall describe the same in more detail in comparison with the prior art and with reference to the accompanying drawings, in which Fig. 1 is a diagrammatic view of a high-tension system of the prior art in which the load is arranged at the side of a voltage multiplier, Fig. 2 is a diagrammatic view of a system according to the invention arranged in a room of the same size as that in Fig. 1, and Fig. 3 is a sectional view on an enlarged scale of a portion of Fig. 2.

In Fig. 1 reference numeral 12 indicates a high-tension room upon the floor 1 of which is arranged a voltage multiplier or a columnar system 2 comprising two condenser columns 3 and 4, and seventeen rectifiers 5 interposed between these columns. The condensers of each column are connected in series so that the voltages of all of the condensers of each column are added. The potential difference relative to ground at the various intermediate sections 6, which interconnect the condenser electrodes, increases upwardly and a metal hollow body or terminal body 7 carried on the columns receives the highest potential, e. g., a few millions of volts. The terminal member 7 slightly extends beyond the columns, which are arranged below it, so as to give the equipotential surfaces a more favorable shape. For the same purpose, its surface is rounded. As such a system has been described in detail in my above-mentioned patent, further description of the same is believed unnecessary.

Arranged between terminal member 7 and the ground on the right-hand side of the generator system 2 is a load system 11 which includes a resistance 8 from which a voltage is taken off to measure the high tension. For this purpose an electrostatic voltmeter (not shown) is connected between ground and a tap on this resistance, the ratio between the value of the resistance in parallel with the measuring instrument and the entire resistance being, for example, 1:1000. In this case, the measuring instrument is always loaded with 1/1000 of the voltage of the terminal member 7 and indicates the high-tension produced. In a well-known form of construction resistance 8 is formed of a large number of carbon resistances connected in series and housed in an oil-filled insulating tube, the total resistance being 1500 megohms.

A transformer 24 serves to supply the alternating current to be changed into high-voltage direct current, and a small transformer 25 serves to provide heating current to the cathodes of tubes 5.

The load system also comprises a discharge tube 9, for instance, an X-ray tube for gamma-rays. Tubes of this kind, which have been described in the U. S. Patent #2,093,002, comprise a plurality of compartments in which the electrons are accelerated in stages. In order to distribute the voltage correctly over the various stages a resistance 10 is provided which has corresponding taps connected to the intermediate electrodes 20 of the X-ray tube 9. A protective resistance 11 arranged between the tube 9 and the terminal member serves to limit the current intensity in the case of breakdown across the X-ray tube.

In the system illustrated the permissible high tension is governed by the distance $a$ between the terminal member 7 and the grounded side wall 12 of the high-tension room.

In accordance with the invention, and as shown in Fig. 2, in which similar parts are indicated by the same reference numerals as in Fig. 1, the generator system 2 is not arranged to one side of the load system but is arranged in the upper part of the high-tension room. Thus the terminal member 7 may be reduced in width since it has to screen a smaller bottom surface. As a result the distance between this member and the grounded wall 12 of the high-tension room is substantially increased and a higher voltage can be produced without danger of arcing.

The load system comprising the measuring resistance 8, X-ray tube 9 and the potentiometer 10, is arranged below terminal 7, and is carried, for example, on a grounded metal table 13 which also serves as a protective wall for the operators operating beneath it, and in some cases for a sick person. Below table 13 is radiographic couch 14. The grounded end 15 of the X-ray tube 9 extends through an opening in table 13 and contains, for example, the grounded anticathode from which the gamma-rays proceed.

Above terminal member 7 the electric field is automatically controlled by the condensers of columns 2 and 3, and below this member it is controlled by resistances 8 and 10.

To avoid flashing-over towards the side walls, I provide cylindrical partitions 16, 17, and 18 of insulating material, metal, or metal-coated insulating material. As shown, partitions 16, 17, and 18 are made of metal and are connected together and to the terminal member 7 and the wall 12 by a plurality of rods each formed of resistances 19, 20, 21, and 22. The potentials of the various partitions 16, 17, and 18 are readily controlled by the ratio of the values of these resistances which makes it possible to avoid excessive concentration of the equipotential surfaces of the electric field adjacent the terminal member 7 and to reduce the wide differences of the potential gradient in the various zones. For example, the resistances 19, 20, 21, and 22 may be so proportioned that the highest potential gradient is identical in each zone. The admissible voltage of the terminal body is thus substantially increased.

I also prefer to make the lengths of the cylindrical portions different, i. e., the length of the outer cylinder 18 should be less than that of the intermediate cylinder 17, and the length of cylinder 17 should be less than that of inner cylinder 16. Thus, in view of rapid potential variations, the capacities of the condensers connected in series and formed by cylinders 16—17, cylinders 17—18, by cylinder 16 and terminal member 7, and by wall 12 and cylinder 18 may be proportioned in accordance with the desired potential distribution. As shown, cylinders 16, 17, and 18 are suspended from the ceiling of the high tension room by ropes 23 of insulating substance, e. g. flax, and the horizontal insulating tubes incorporating the potential-controlling resistances 19, 20, 21 and 22 support the cylinders in position.

Arranged on the upper surface of the ceiling are a transformer 24 which supplies current to the apparatus, and a current supply 25 which supplies heating current to the filaments of the rectifiers 5.

The system may be arranged in a reverse manner to that shown in Fig. 2; i. e., the point of operation may be near the ceiling and the columnar system 2 may be arranged on the floor 1, with the load system arranged intermediate the terminal member 7 and the ceiling 26. As such an alternate arrangement will be apparent to one skilled in the art, illustration or further description of the same is believed unnecessary.

Although in the foregoing I have referred to an X-ray tube, by way of example, as the load, the system may be used for other purposes, for example for the production of neutrons. For this purpose it is generally desirable that the terminal member 7 should have a positive potential with respect to ground. In this case the rectifiers 5 have to be reversed; i. e., the cathode and the anode have to be interchanged. It is thus possible without particular difficulty to construct the receptacles for the rectifiers so as to permit of the rectifiers being also inserted upside down so that if required, the polarity of the system can be rapidly reversed.

The construction shown in Fig. 3 allows to easily change the high tension polarity. The rectifiers 5 between the columns are connected side by side to intermediate sections 6. Each section consists of a connecting member 30 and a metal cap 29, the latter surrounding the contact members for the cathodes of the rectifiers. These contact members are mounted on a body of insulating material 31, pivotable at 44. They comprise a socket 35 and a contact plate 32 for the screw fitting 36 of the rectifier, each provided with a terminal (33 and 34) for the connection of the current supply wires (not shown).

At its anode-end, the rectifier is provided with a rounded metal member 38 secured thereto by means of a screw-thread connection. Member 38 comprises an inwardly extending portion 39 having a bore 40. Slidably arranged in said bore is a cup shaped metal member 41, constituting terminal piece for the anode-end of the rectifiers. An annular disc 42 connected to the cap 38, engages said cup shaped member which at its inner end is formed with an edge bearing on disc 42. Member 41 is pressed outwardly by means of a spring 43. It may be pushed inwardly against the force of the spring so as to be clear from the metal cap 29. Then the rectifier may be pivoted downwardly and brought in a second position in which the terminal piece 41 engages the next intermediate portion of the same column. The next rectifier, which is also shown in Fig. 3, may in the same way be swung downwardly about the axis 45 and be substituted by the first mentioned rectifier. If all the tubes have changed their position as indicated by arrows 46 and 47 (the lowermost tube being taken out and put at the top) each tube is substituted by a tube in a reversed sense and the polarity of the plant is reversed thereby.

The filaments of the rectifiers may be heated by a high-frequency system in the manner described in my U. S. Patent 2,045,034, or may be heated by current supplied by heating-current generators arranged in the intermediate sections 6. These generators may be driven by a motor at ground potential via insulated shafts, as described in my above-mentioned Patent 1,974,328.

While I have described my invention in connection with specific examples and applications, I do not wish to be limited thereto but desire the appended claims to be construed as broadly as is permissible in view of the prior art.

What I claim is:

1. A high-tension system for producing direct voltages of the order of $10^6$ volts comprising a plurality of condensers arranged in columns, rectifiers connected between said columns, and a terminal member adapted to receive a high voltage with respect to ground, said member being arranged at adjacent ends of said columns, and a load for said system arranged on the side of the member opposite the columns and in the direction of extension of the columns, the end of the load adjacent said member being electrically connected thereto.

2. A high-tension system for producing a direct voltage of the order of $10^6$ volts comprising a plurality of condensers arranged in columns, rectifiers connected between said columns, and a terminal member at one end of said columns and adapted to receive the high tension, and a load for said system arranged on the side of the member opposite the columns and extending in line with the columns, one end of the load being adjacent said terminal member and electrically connected thereto.

3. A generating system for producing from alternating current a direct voltage of the order of $10^6$ volts comprising a plurality of condensers arranged in a plurality of columns, terminals for said condensers, a terminal member arranged on said columns and adapted to receive the high voltage produced, rectifier tubes connected in series, each two successive rectifier tubes being shunted by one of said condensers, and means to change one end of each rectifier from a terminal to one condenser to a terminal of the adjacent condenser to thereby reverse the polarity of the voltage produced at said terminal member, said means comprising a rotatable connection on the other end of each rectifier.

4. A high-tension system for producing direct voltages of the order of $10^6$ volts comprising a plurality of condensers arranged in substantially parallel columns, rectifiers connected between said columns, a terminal member arranged at adjacent ends of said columns and adapted to receive a high voltage with respect to ground, a load extending in the direction of said columns with one end connected to said terminal, and means to control the potential distribution on the space around said terminal member.

ALBERT BOUWERS.